W. H. KILBOURN.
TROLLEY STAND.
APPLICATION FILED JUNE 12, 1915.
1,172,536.  Patented Feb. 22, 1916.
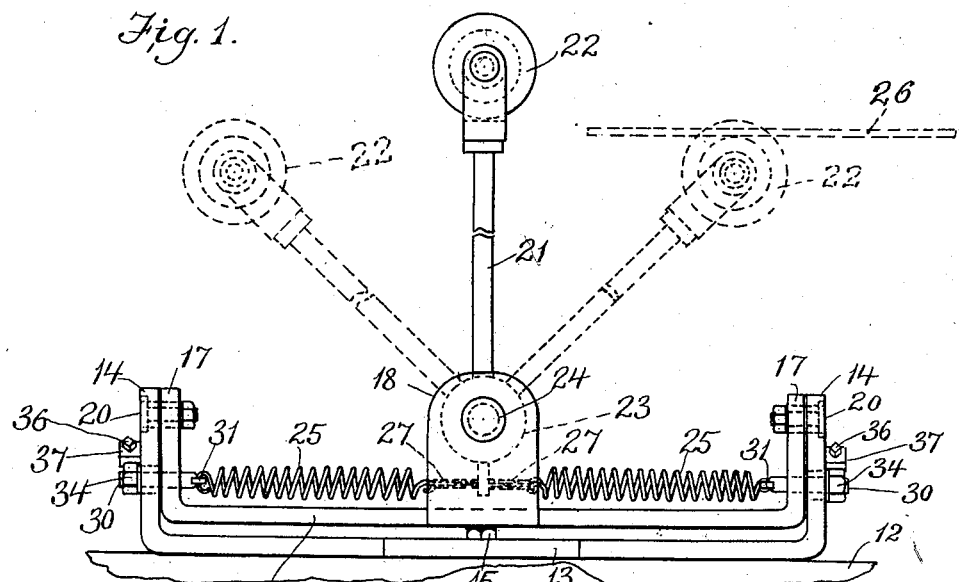
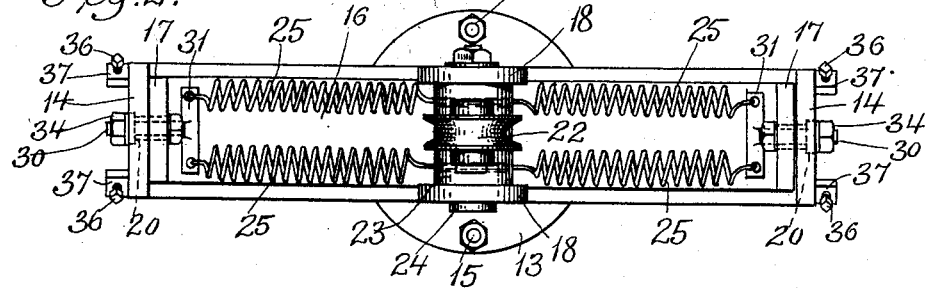
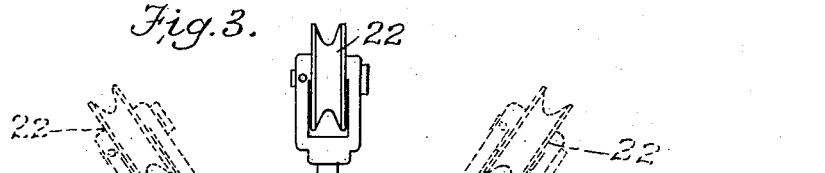
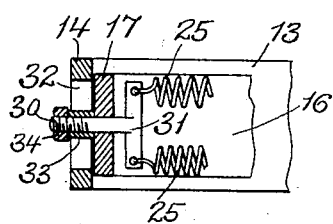
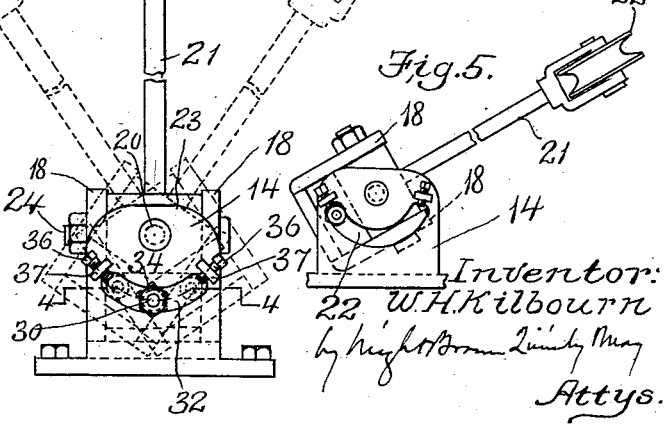
Witnesses:
Inventor:
W. H. Kilbourn
Attys.

UNITED STATES PATENT OFFICE.

WASHINGTON H. KILBOURN, OF GREENFIELD, MASSACHUSETTS.

TROLLEY-STAND.

1,172,536.  Specification of Letters Patent.  Patented Feb. 22, 1916.

Application filed June 12, 1915. Serial No. 33,848.

*To all whom it may concern:*

Be it known that I, WASHINGTON H. KILBOURN, a citizen of the United States, and resident of Greenfield, in the county of Franklin and State of Massachusetts, have invented certain new and useful Improvements in Trolley-Stands, of which the following is a specification.

This invention relates to supports for trolley arms of electric cars in which the trolley arm is pivoted to a base which is not rotatable on the roof of the car, the base being adapted to oscillate on an axis extending lengthwise of the car, and the trolley arm being adapted to oscillate on an axis extending crosswise of the car.

The invention has for its object to provide a trolley arm support or trolley stand of this character in which the springs which press the trolley wheel against the usual feed wire, act only to press the grooved periphery of the wheel outwardly against the wire without pressing either of the flanges of the wheel sidewise against the wire, so that the tendency of the trolley wheel to leave the wire, due to side pressure of one of its flanges against the wire, is eliminated, the arm-controlling springs being so arranged that when the trolley leaves the wire, the trolley arm is not supported by the springs and immediately drops to a position of safety below cross wires and other parts of the road equipment liable to be struck and injured by a disengaged trolley arm.

The invention consists in the improvements which I will now proceed to describe and claim.

Of the accompanying drawings:—Figure 1 represents a side view of a trolley stand embodying my invention. Fig. 2 represents a top plan view of the same. Fig. 3 represents an end view. Fig. 4 represents a section on line 4—4 of Fig. 3. Fig. 5 represents a view similar to Fig. 3, but on a smaller scale, showing a greater lateral depression of the trolley arm.

The same reference characters indicate the same parts in all the figures.

In the drawings, 12 represents a portion of the roof of an electric car, and 13 represents an elongated base plate secured to the roof by bolts 15 and extending lengthwise of the car, said plate being provided at its ends with upturned ears 14.

16 represents a rocking trolley base which, as here shown, is composed of an elongated plate having upwardly projecting ears 17 at its ends, and upwardly projecting ears 18 at its longitudinal edges midway between the ears 17. The ears 17 are pivotally connected with the fixed ears 14 by horizontal pivots 20 which are in alinement with each other and constitute an axis extending lengthwise of the car, the base 16 being adapted to rock crosswise of the car on said axis.

21 represents a trolley arm having the usual trolley wheel 22 at its outer end, and a hub 23 at its inner end. Said hub is connected with the ears 18 of the rocking base, by a transverse pivot 24 which constitutes an axis extending crosswise of the car, the trolley arm being adapted to oscillate on said axis lengthwise of the car. The trolley arm 21 is normally held yieldingly in a position perpendicular to the rocking base 16, as indicated by full lines in Fig. 1, by means of oppositely acting springs 25 of which four are shown in this embodiment of the invention. The outer ends of the springs 25 are connected with the ears 17 of the rocking base, and their inner ends are connected by short chains 27 with the trolley arm hub 23.

The springs at one side of the axis 24 of the trolley arm exert a pulling force in one direction, and the springs at the opposite side of said axis exert a pulling force in the opposite direction, so that the springs conjointly when at rest, hold the trolley arm perpendicular to the rocking base and permit the arm to be inclined toward either end of the car, as indicated by dotted lines in Fig. 1.

The springs 25 do not exert force or pressure on the rocking base and trolley arm tending to resist a swinging movement of the arm crosswise of the car, the outer ends rocking base, so that said springs act only to move the trolley arm toward a position perpendicular to the rocking base and thus press the curved periphery of the trolley wheel 22 outwardly against the usual feed wire 26. When the trolley wheel is disengaged from the feed wire, the trolley arm is not supported by the springs against movement crosswise of the car, and therefore swings downwardly by gravitation toward one side or the other of the car, as indicated by dotted lines in Fig. 3. This sidewise swinging movement of the trolley arm depresses it to a position of safety below the cross wires and other objects with which the trolley arm would be liable to collide if it were supported against sidewise swinging movement, hence, the usual retriever mechanism employed to prevent injurious contact of a disengaged trolley arm with objects in its path, is rendered unnecessary.

The absence of spring pressure on the trolley arm resisting swinging movements thereof crosswise of the car also prevents lateral spring pressure of either of the flanges of the trolley wheel 22 against the feed wire 26. The trolley wheel therefore runs with the minimum of friction on the wire when the car is moving on curves. The absence of lateral spring pressure tending to press either of the flanges of the trolley wheel more forcibly against the wire than the other flange, also reduces to the minimum the liability of the separation of the wheel from the wire when it is in running contact therewith, it being a fact that when one flange of the wheel presses harder against the wire than the other flange, the wheel is liable to run off from the wire, especially when running on curved or laterally deflected portions of the wire.

The springs 25 are preferably adjustably connected with the ears 17 of the rocking base by bolts 30 having heads 31. Said bolts project through arc-shaped slots 32 in the fixed ears 14, a portion of each bolt which extends through a slot 32 being surrounded by a sleeve 33, the inner end of which bears on the corresponding ear 17 while the outer end forms a seat for a nut 34 engaged with the threaded outer end portion of the bolt 30. By turning the nut 34 in one direction, the bolt 30 is drawn outwardly and caused to increase the tension of the springs 25 connected with its head 31.

Means are provided for limiting the swinging movements of the rocking base and trolley arm crosswise of the car. Said means preferably include the bolts 30 and their sleeves 33, and adjustable stop screws 36 engaged with lugs 37 on the fixed ears 14, said screws being at opposite ends of the arc-shaped slots 32 and forming abutments for the bolt sleeves 33.

The bed plate 13 is preferably provided with bolt holes adapted to receive the bolts 15, as ordinarily arranged to receive the base of a reversible trolley stand of the kind commonly used, so that my improved trolley stand may be readily substituted for one already in use by removing the latter and utilizing its securing bolts 15 to secure the bed plate 13.

My improved trolley stand is characterized chiefly by the fact that when the trolley wheel is engaged with the feed wire, its grooved periphery is pressed outwardly against the wire without side pressure of either of its flanges against the wire, and further by the fact that when the trolley wheel leaves the wire, the trolley arm is unsupported against swinging movement crosswise of the car, and therefore drops to a position of safety. Since the base 16 does not rotate on a vertical axis like the reversible bases of ordinary trolley stands, the flange portions of the wheel that are in contact with the wire are less liable to run off or leave the wire at curves, than would be the case if the base were rotatable on a vertical axis, as I have learned by practical experience.

In practice the trolley arm 21, when arrested in a laterally depressed position after the disengagement of the wheel 22 from the feed wire, will be lower than the positions indicated by dotted lines in Fig. 3, so that the wheel and the outer end of the arm will pass safely under cross wires, etc., without striking the same, as indicated by Fig. 5.

I claim:—

1. A trolley stand comprising a rocking base, means pivotally connecting the base with the car and permitting the base to oscillate on an axis extending lengthwise of the car, a trolley arm, means pivotally connecting the arm with the base and permitting the arm to oscillate on an axis extending crosswise of the car, and resilient means carried by the rocking base and normally holding the trolley arm substantially perpendicular to the rocking base, said means being adapted to press the trolley wheel upwardly against the trolley wire, without pressing either of the flanges of the trolley wheel laterally against the wire, and without offering resistance to lateral movements of the trolley arm crosswise of the car, whereby when the trolley wheel leaves the wire it is laterally unsupported and drops to a position of safety.

2. A trolley stand comprising fixed supports adapted for attachment to the roof of a car, a rocking base pivoted to said supports and adapted to oscillate on an axis extending lengthwise of the car, a trolley arm pivoted to the rocking base and adapted to oscillate independently on an axis at right angles to the axis of the base, and oppositely acting springs connecting the trolley arm with the base, and adapted to normally hold the trolley arm substantially perpendicular to the base, the arm and base being adapted to oscillate laterally or crosswise of the car without resistance by said springs, whereby lateral spring pressure of either of the flanges of the trolley wheel on the trolley wire is prevented, and the arm is permitted to drop to a position of safety when the wheel leaves the wire.

3. A trolley stand comprising fixed supports adapted for attachment to the roof of a car, a rocking base pivoted to said supports and adapted to oscillate on an axis extending lengthwise of the car, a trolley arm pivoted to the rocking base and adapted to oscillate independently on an axis at right angles to the axis of the base, and oppositely acting springs connecting the trolley arm with the base, and adapted to normally hold the trolley arm substantially perpendicular to the base, the arm and base being adapted to oscillate laterally or crosswise of the car without resistance by said springs, means being provided for limiting the lateral oscillations of the base and arm.

4. A trolley stand comprising fixed supports adapted for attachment to the roof of a car, a rocking base pivoted to said supports and adapted to oscillate on an axis extending lengthwise of the car, a trolley arm pivoted to the rocking base and adapted to oscillate independently on an axis at right angles to the axis of the base, oppositely acting springs connecting the trolley arm with the base, and adapted to normally hold the trolley arm substantially perpendicular to the base, the arm and base being adapted to oscillate laterally or crosswise of the car without resistance by said springs, and means carried by the rocking base for adjusting the tension of the springs.

5. A trolley stand comprising fixed supports adapted for attachment to the roof of a car, a rocking base pivoted to said supports and adapted to oscillate on an axis extending lengthwise of the car, a trolley arm pivoted to the rocking base and adapted to oscillate independently on an axis at right angles to the axis of the base, and oppositely acting springs connecting the trolley arm with the base, and adapted to normally hold the trolley arm substantially perpendicular to the base, the arm and base being adapted to oscillate laterally or crosswise of the car without resistance by said springs, the said fixed supports being provided with arc-shaped slots and with adjustable stops at the ends of said slots, and the rocking base being provided with studs projecting through said slots and movable therein between the stops.

6. A trolley stand comprising fixed supports adapted for attachment to the roof of a car, a rocking base pivoted to said supports and adapted to oscillate on an axis extending lengthwise of the car, a trolley arm pivoted to the rocking base and adapted to oscillate independently on an axis at right angles to the axis of the base, oppositely acting springs connecting the trolley arm with the base, and adapted to normally hold the trolley arm substantially perpendicular to the base, the arm and base being adapted to oscillate laterally or crosswise of the car without resistance by said springs, the said fixed supports being provided with arc-shape slots, and studs attached to the outer ends of said springs and adjustably connected with the rocking base, said studs projecting through the arc-shaped slots and being provided with means for adjustment to vary the tension of the springs.

In testimony whereof I have affixed my signature.

WASHINGTON H. KILBOURN.

Witnesses:
MAY KILBOURN,
LYMAN W. GRISWOLD.